United States Patent [19]

Grant et al.

[11] 3,926,937

[45] Dec. 16, 1975

[54] POLYMERIC SOMATOSTATIN

[75] Inventors: Norman H. Grant, Wynnewood; Dimitrios Sarantakis, Audubon, both of Pa.

[73] Assignee: American Home Products Corporation, New York, N.Y.

[22] Filed: Apr. 18, 1974

[21] Appl. No.: 462,149

[52] U.S. Cl. ............................. 260/112.5; 424/177
[51] Int. Cl.. C07c 103/52; C08h 1/00; A61k 37/00
[58] Field of Search .................................. 260/112.5

[56] References Cited
OTHER PUBLICATIONS

Burgus et al.: Proc. Nat. Acad. Sci. USA, 70, 684–688 (1973).

Vale et al.: C. R. Acad. Sci. Paris, Ser. D, 275, 2913–2916 (1972).

*Primary Examiner*—Lewis Gotts
*Assistant Examiner*—Reginald J. Suyat
*Attorney, Agent, or Firm*—Richard K. Jackson

[57] ABSTRACT

Polymeric reduced somatostatin is prepared by oxidizing the linear (reduced) form of somatostatin. The product of the invention exhibits prolonged inhibitory activity preventing the release of excessive amounts of growth hormone.

1 Claim, No Drawings

POLYMERIC SOMATOSTATIN

BACKGROUND OF THE INVENTION

It is known that crude hypothalamic preparations will inhibit the secretion of growth hormone, somatotropin. Recently, the structure of a somatotropin-release-inhibiting-factor (somatostatin) has been elucidated by Brazeau et. al., Science, 179, 77 (1973) as

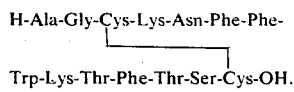

The activity of somatostatin or SRIF in inhibiting the release of growth hormone has been found to be limited to about 20 minutes in duration, whether the somatostatin is in its cyclic form or in its linear reduced form.

BRIEF DESCRIPTION OF THE INVENTION

In accordance with this invention there is provided a polymer of linear (reduced) somatostatin in which cysteine[3] and cysteine[14] have been caused to react randomly to form 3—3, 3-14 and 14—14 disulfide linkages, resulting in a head to head, tail to tail and head to tail polymer containing from two to about 100 repeating units and possessing improved growth hormonerelease-inhibiting qualities. The polymeric reduced somatostatin, (PRS) is administered to a mammal either orally, intravenously, subcutaneously or intramuscularly. The oral dose, presented in tablet or capsule form, is from about 0.015 milligram to about 7 milligrams per kilogram body weight per day, while the intravenous injection is administered in aqueous medium at about 0.1 microgram to about 0.15 milligram per kilogram body weight per day. Subcutaneous and intramuscular doses are from 0.15 microgram to about 0.7 milligram per kilogram body weight per day. Administration of PRS via either the protamine zinc or protamine aluminum complex is restricted to the subcutaneous or intramuscular routes.

DETAILED DESCRIPTION OF THE INVENTION

This invention provides polymeric reduced somatostatin containing from about 0.090 to about 1.0 milliequivalents free sulfhydryl groups per millimole of polymer, of molecular weight from 3,636 to about 182,000, bonded by Cys 3—3, Cys 3-14 and Cys 14—14 disulfide linkages, presenting the formula:

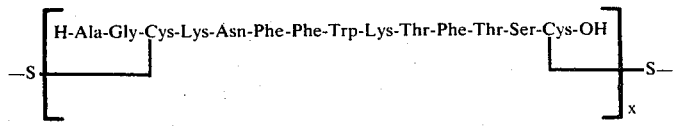

in which $x$ is an integer from 2 to 100, inclusive, and protamine zinc and protamine aluminum complexes and mixtures thereof.

The polymeric reduced somatostatin of this invention is prepared by oxidizing reduced (linear) somatostatin H-Ala-Gly-Cys(SH)-Lys-Asn-Phe-Phe-Trp-Lys-Thr-Phe-Thr-Ser-Cys(SH)-OH to produce disulfide linkages with the free mercapto groups of the cysteine[3] and cysteine[14] moieties. The oxidation is conducted in aqueous medium at ambient temperature, at pH 4 to 10 preferably 6 to 10, adjusted as needed with conventional buffer systems. The reaction time varies with the oxidant employed, from a very short time of about 5 minutes to 8 hours with chemical oxidants to between 5 minutes and 4 days when atmospheric oxygen is employed as the oxidant.

The applicable oxidants for the process of this invention include oxygen, either uncatalyzed as present in the atmosphere, or in a catalyzed system wherein the catalyst is one of the cupric, ferrous, cobaltous, manganous or selenite $(SeO_3)^{-2}$ ion or one of the known fungal enzymes; hydrogen peroxide, non-catalyzed or catalyzed as by the cupric or ferrous ions; sulfoxides, such as dimethylsulfoxide; azo compounds, such as

or $(CH_3)_2NCON=NCON(CH_3)_2$; nitro compounds, such as tetranitromethane; methylene blue; tetrazolium salts; chloranil; dichlorophenol; dithiobis(thioformates); iodine; the bromate or iodate ion; flavins; cytochromes; dehydroascorbic acid; or by radiation with X-rays or $\beta$-rays. Each of these oxidant systems have been employed in one form or another to oxidize mercaptans to dithio ethers in the past, and the techniques employed are known to the polypeptide chemist. The crude product of the oxidation reaction is purified by any means known to the polypeptide chemist, i.e. column chromatography, countercurrent extraction, etc., to yield PRS containing an amount of sulfhydryl groups (as cysteine) intermediate between that of cyclic somatostatin and its linear (reduced) counterpart.

The potency of somatostatin and the polymeric product of this invention is substantially the same. In monolayer cultures of rat pituitary cells, somatostatin inhibits growth hormone release at concentrations down to about 0.2 nanograms per milliliter and prolactin at concentrations down to about 5 nanograms per milliliter. Under similar test conditions, the polymer of this invention (PRS) demonstrates both activities down to a concentration of about 1 nanogram per milliliter However, the product of this invention inhibits the release of growth hormone in mammals for extended periods of time when compared to somatostatin or reduced (linear) somatostatin. Thus, at comparable dosage levels, the product of this invention, when administered neat, inhibits the release of somatotropin (growth hormone) for periods up to and in excess of 3.5 hours, while somatostatin is effective for a maximum period of about 20 minutes in all mammals in which it has been tested. Furthermore, the product of this invention inhibits the release of prolactin for periods up to and in excess of 22 hours. It is hypothesized, that the prolonged activity of PRS is due to some inherent resistance toward plasma proteinases which are capable of degrading the monomeric molecule to inactive fragments, although applicants do not want to be bound by any specific theory of operation.

Thus, PRS is useful in the prevention of excessive secretion of somatotropin in domestic animals and for the control of the secretion of immuno-reactive pituitary growth hormone in comparative and experimental pharmacology. Furthermore, the known relationship between growth hormone control in standard experimental animals and the human, characterizes the product of this invention as a useful compound in the treatment of acromegaly, excessive statural growth, and vacular complications of diabetes, e.g. blindness. Furthermore, the polymer (PRS) of this invention may be used to produce somatostatin in pure form by reducing the poly-disulfide linkages and reforming them in the cyclic form of somatostatin. When used directly, PRS is administered by conventional routes as indicated, supra.

The polymeric reduced somatostatin of this invention forms protamine zinc and protamine aluminum complexes in the manner conventional in polypeptide chemistry for similar polymers e.g. insulin. Thus, for example, protamine sulfate and zinc chloride is admixed with PRS in a phosphate buffered aqueous solution in any desired amount and the product forms as a gel or stable suspension at ambient temperature to yield the desired complex. The same procedure is followed in the product of the protamine-aluminum complex.

The polymer of this invention is physically and chemically distinguishable from both somatostatin and its reduced (linear) counterpart by average molecular weight, sulfhydryl group content and size distribution via molecular sieving.

The average molecular weight of PRS as determined from sedimentation and diffusion in a centrifugal field following the method of Svedberg and Pederson, "The Ultracentrifuge", Oxford, Clarendon Press, 1940 is about 35,000. Thus, the product of this invention averages about seventeen or eighteen times the molecular weight of somatostatin (m.w. 1818). Embraced by that average molecular weight are the polymers containing from two to about 100 repeating units reduced somatostatin and presenting molecular weights from 3,636 for the cyclic dimer to about 182,000.

The sulfhydryl group analysis, performed by the method of Grassetti and Murray, Arch. Biochem. Biophys, 119 41 (1967) indicates that reduced (linear) somatostatin (m.w. 1820) contains $9.41 \times 10^{-4}$ milliequivalents —SH per milligram or 1.711 milliequivalents —SH per millimole; cyclic somatostatin (m.w. 1818) contains $0.40 \times 10^{-4}$ milliequivalents —SH per milligram or 0.073 milliequivalents —SH per millimole; and PRS (average m.w. 35,000) contains $1.05 \times 10^{-4}$ milliequivalents —SH per milligram or 0.191 milliequivalents —SH per millimole. Of course, in theory, the cyclic somatostatin should contain no free sulfhydryl groups, and the linear should contain 2.0 milliequivalents —SH per millimole. In any event, the sulfhydryl analysis, based upon an average molecular weight describes the product as possessing from about 0.090 to about 1.0 milliequivalents of free sulfhydryl groups per millimole of polymer. Thus, the polymeric dimer, of molecular weight 3638 in its linear form possesses around 1.0 milliequivalents —SH per millimole polymer.

The polymer (PRS) of this invention passes a molecular sieve more rapidly than somatostatin, which presents a smaller molecule. Employing a Sephadex G-50F column (2.5 × 40 centimeters) with 0.5M acetic acid as the elution solvent at a rate of 37 milliliters per hour, the cyclic molecule somatostatin is concentrated sharply about fraction 84 with an elution volume of 194 milliliters whereas the polymer of this invention is eluted over a broader range in accordance with the following results obtained from two different polymer preparations produced by the same polymerization process.

|  | Fraction Number | Elution vol. in ml. |
|---|---|---|
| Polymer I | 29 | 67 |
|  | 34 | 79 |
|  | 82 | 190 |
| Polymer V | 37 | 86 |
|  | 85 | 197 |

Thus, the polymer PRS may be readily recovered before the cyclic somatostatin appears in the eluate. The last peak in each run, found at fraction No. 82 and 85 for each of the polymers I and V represents traces of monomer appearing in the eluate.

In each of the following examples, the amino acids are of the L-series in the polypeptide structure.

EXAMPLE I

Polymeric Reduced Somatostatin.

Boc-Ala-Gly-Cys(SMBzl)-Lys(Cbz)-Asn-Phe-Phe-Trp-Lys(Cbz)-Thr(Bzl)-Phe-Thr(Bzl)-Ser(Bzl)-Cys(SMBzl)-OBzl (1.87 gram; 0.72 millimoles) is mixed with anisole (2 milliliters) and treated with liquid HF (100 milliliters) for 45 minutes at room temperature. The excess HF is evaporated in high vacuo and the residue is taken up in 2N aqueous acetic acid containing 1 percent mercaptoethanol and lypholized. The lyophilizate is suspended in one liter of 0.5 M ammonium acetate and the pH is adjusted to 7.7. The suspension is exposed to the atmosphere for three days. The mixture is then lyophilized until all the ammonium acetate is removed and the residue is taken up in 2N aqueous acetic acid and filtered. The filtrate is placed on a column (2.5 × 150 centimeters) of Sephadex G 25 (fine) and eluted with 2N aqueous acetic acid. The eluate is fractionated (fraction size 5 milliliters) and analyzed by the Folin-Lowry method. The fractions appearing in tubes 45-85 are pooled and lyophilized to yield 379 milligrams of white fluffy homopolymeric somatotropin-release-inhibiting-factor.

Optical rotation: $[\alpha]_D^{25} -12°$

EXAMPLE II

To a solution of 150 milligrams of methylene blue (methylthionine chloride) (0.4 millimoles) in 25 milliliters of 0.05 M $KH_2PO_4$—$Na_2HPO_4$, pH 7.9, there is added 182 milligrams of reduced (linear) somatostatin (0.2 millimoles) in 25 milliliters of the same buffer. The mixture is thoroughly mixed at room temperature. The deep blue color of the methylene blue turns to pale blue as it is reduced by the linear somatostatin to leuco methylene blue. After 2 hours, the solution is chromatographed on a column of Sephadex G-50 and the non-excluded material is lyphilized giving 112 milligrams of homopolymeric somatotropin-release-inhibiting-factor.

EXAMPLE III

Five rats were injected subcutaneously with 1 microgram of estradiol in 0.2 milliliters of corn oil. Twenty-four hours later (0 time), a blood sample was taken by cardiac puncture and 150 micrograms of the product of Example 1 in 0.5 milliliters saline was administered to each rat by subcutaneous injection. At + 30 minutes, an additional 150 micrograms of the product of Example I in 0.5 milliliters saline was administered to each rat by the same route. At + 50 minutes, a second blood sample was taken and the plasma prolactin was determined by radio-immunoassay. The initial and final levels of prolactin (M ± S.E.M.) were: 84.0 ± 7.6 and 49.4 ± 2.6 nanograms per milliliter respectively. Analysis of variance gives F = 18.5 with a significance level less than 0.01. Ten rats, bled on the same schedule, without the treatment, had initial and final PRL levels of 40.2 ± 6.5 and 39.8 ± 5.6 nanograms/milliliter, respectively. Thus, the decrease in PRL levels in the treated rats was not characteristic of the experimental procedure, i.e. a stress effect.

EXAMPLE IV

Homopoly-somatotropin-release-inhibiting-factor (SRIF) (0.5 milligram) was dissolved in 5 milliliters of phosphate buffered saline (0.51 gram $KH_2PO_4$, 8.94 grams $Na_2HPO_4$ and 9 grams NaCl per liter) and lyophilized in ampules. To each ampule containing 0.5 milligram homopoly SRIF there was added 5 milliliters of "diluent C" (0.5 milligram protamine sulfate and 5.0 milligrams $AlCl_3$ per milliliter of water). Six male rats (200–220 grams) which had been "gentled" (held in the hand several times per day for 3 days) were injected subcutaneously with 0.6 milliliter (60 micrograms) of the milky white suspension of homopoly - SRIF. Six male rat controls, otherwise identically treated, were injected with 0.6 milliliter of "diluent C" alone. After 3.5 hours, the rats were decapitated and plasma samples taken from the trunk were assayed for growth hormone (GH). The mean control GH was 61.4 ± 23.0 nanograms per milliliter. The mean treated group GH was 6.6 ± 0.9 nanograms per milliliter. The difference in the assayed GH values is significant at the 95 percent confidence level. Hence, the rats treated with homopoly SRIF demonstrated control of GH secretion after at least 3.5 hours following one injection of the product of this invention.

EXAMPLE V

The procedure of the preceding paragraph was repeated except that the group of control rats were injected with 0.6 milliliter of "diluent C" and phosphate buffered saline, made up in the same proportion as used to dissolve homopoly - SRIF. Twenty-two hours after injections, the animals were decapitated and blood samples collected. The prolactin (PRL) release was measured. The mean PRL levels for the control and treated rats (nanograms/milliliter, M ± S.E.M.) were 47.9 ± 7.3 and 17.3 ± 2.3, respectively. This difference was significant at the 99 percent confidence level.

EXAMPLE VI

The protamine zinc complex of polymeric reduced somatostatin is prepared, essentially in the same manner as the protamine aluminum complex is prepared in Example IV. Thus 0.5 mg PRS is dissolved in 5 ml. phosphate buffered saline (0.51 g $KH_2PO_4$; 8.94 g $Na_2HPO_4$ and 9 g NaCl per liter). To the solution is added, 25 mg protamine sulfate and 25.0 mg of $ZnCl_2$. The product PRS - protamine zinc complex forms as a stable gelatinous suspension.

What is claimed is:

1. Polymeric reduced somatostatin containing from about 0.090 to about 1.0 milliequivalents free sulfhydryl groups per millimole of polymer, of molecular weight from 3,636 to about 182,000, bonded by Cys 3-3, Cys 3-14 and Cys 14-14 disulfide linkages, presenting the formula:

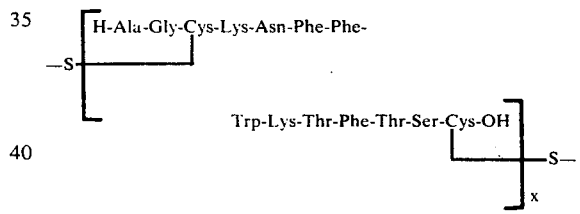

in which each of the amino acid units containing an asymmetric α-carbon atom is in the L-configuration, x is an integer from 2 to 100, inclusive; protamine zinc complexes, protamine aluminum complexes and mixtures thereof.

* * * * *